United States Patent
Killich et al.

(10) Patent No.: US 11,307,086 B2
(45) Date of Patent: Apr. 19, 2022

(54) MEASURING DEVICE AND METHODS FOR CHARACTERIZATION OF A RADIATION FIELD

(71) Applicant: LaVision BioTec GmbH, Bielefeld (DE)

(72) Inventors: Frank Killich, Gottingen (DE); Uwe Engeland, Gottingen (DE)

(73) Assignee: LaVision BioTec GmbH, Bielefeld (DE)

( * ) Notice: Subject to any disclaimer, the term of this patent is extended or adjusted under 35 U.S.C. 154(b) by 0 days.

(21) Appl. No.: 17/159,205

(22) Filed: Jan. 27, 2021

(65) Prior Publication Data

US 2021/0172794 A1  Jun. 10, 2021

Related U.S. Application Data

(63) Continuation of application No. 16/331,970, filed as application No. PCT/EP2016/001607 on Sep. 26, 2016, now abandoned.

(51) Int. Cl.
| | | |
|---|---|---|
| *G01J 1/42* | (2006.01) | |
| *G01J 1/04* | (2006.01) | |
| *G01J 1/02* | (2006.01) | |
| *G02B 5/00* | (2006.01) | |

(52) U.S. Cl.
CPC ............ *G01J 1/4257* (2013.01); *G01J 1/0266* (2013.01); *G01J 1/0411* (2013.01); *G01J 1/0414* (2013.01); *G01J 1/4228* (2013.01); *G02B 5/001* (2013.01); *G01J 1/0425* (2013.01)

(58) Field of Classification Search
CPC ...... G01J 1/4257; G01J 1/4228; G01J 1/0266; G01J 2001/4295; G01J 1/0411; G01J 1/0407; G01J 1/0414; G01J 1/0425; G02B 5/001
See application file for complete search history.

(56) References Cited

U.S. PATENT DOCUMENTS

| | | | |
|---|---|---|---|
| 6,184,989 B1 * | 2/2001 | Sivathanu | G01N 21/4795 356/437 |
| 8,559,690 B2 * | 10/2013 | Aspelmeier | G06T 11/006 382/131 |
| 8,988,673 B2 * | 3/2015 | Guttman | G01J 1/0214 356/121 |

(Continued)

OTHER PUBLICATIONS

Guttmann et al., "Image of laser from Rayleigh scattering directly correlated to beam waist measurements of high-power lasers", presented at ICALEO in 2015, XP55382398, pp. 1-4 (Oct. 2015). (Year: 2015).*

(Continued)

*Primary Examiner* — John R Lee
(74) *Attorney, Agent, or Firm* — Jaquelin K. Spong

(57) ABSTRACT

A radiation field measuring device for the characterization of a radiation comprises a detector device and a reconstruction device. The detector device may have at least one detector camera, which contains at least one detector array arranged for the image recording of scattered radiation in a multiplicity of lateral directions that deviate from the longitudinal direction. The reconstruction device may be configured for the tomographic reconstruction of a field density of the scattered radiation in the radiation field.

15 Claims, 16 Drawing Sheets

(56) References Cited

U.S. PATENT DOCUMENTS

| | | | | |
|---|---|---|---|---|
| 2005/0123303 A1* | 6/2005 | Guttman | G01J 3/0218 | |
| | | | 398/142 | |
| 2008/0049899 A1* | 2/2008 | Rothschild | G01N 23/20 | |
| | | | 378/86 | |
| 2012/0281896 A1* | 11/2012 | Aspelmeier | G06T 11/006 | |
| | | | 382/131 | |
| 2013/0016358 A1* | 1/2013 | Guttman | G01J 1/02 | |
| | | | 356/445 | |
| 2014/0368811 A1* | 12/2014 | Yablon | G01M 11/37 | |
| | | | 356/73.1 | |
| 2017/0213365 A1* | 7/2017 | Koehler | G01N 23/041 | |
| 2018/0164232 A1* | 6/2018 | Salditt | G01N 23/046 | |
| 2019/0250030 A1* | 8/2019 | Killich | G01J 1/0266 | |
| 2021/0172794 A1* | 6/2021 | Killich | G02B 5/001 | |

OTHER PUBLICATIONS

Simmons et al., "Development of a non-contact diagnostic tool for high power lasers", SPIE, Mar. 18, 2016, XP60064849, pp. 1-6 (Mar. 2016). (Year: 2016).*

Guttman, "Noninterceptive beam profiling of high-power industrial lasers", Laser Technik Journal, 2015, XP55383558, pp. 1-5 (May 2015. (Year: 2015).*

* cited by examiner

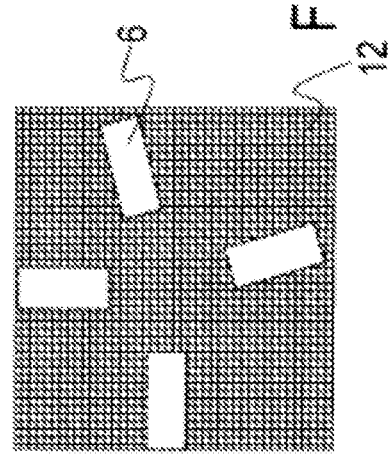
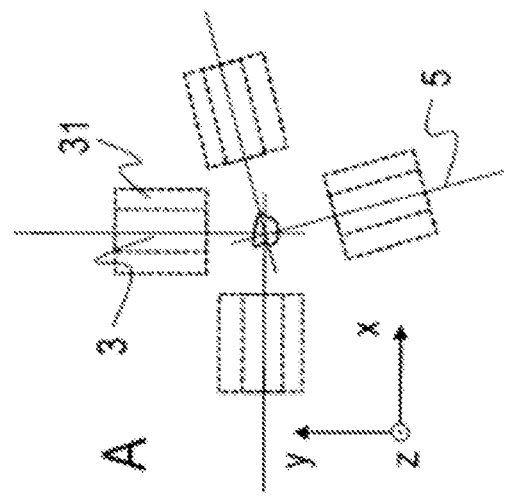
FIG. 2

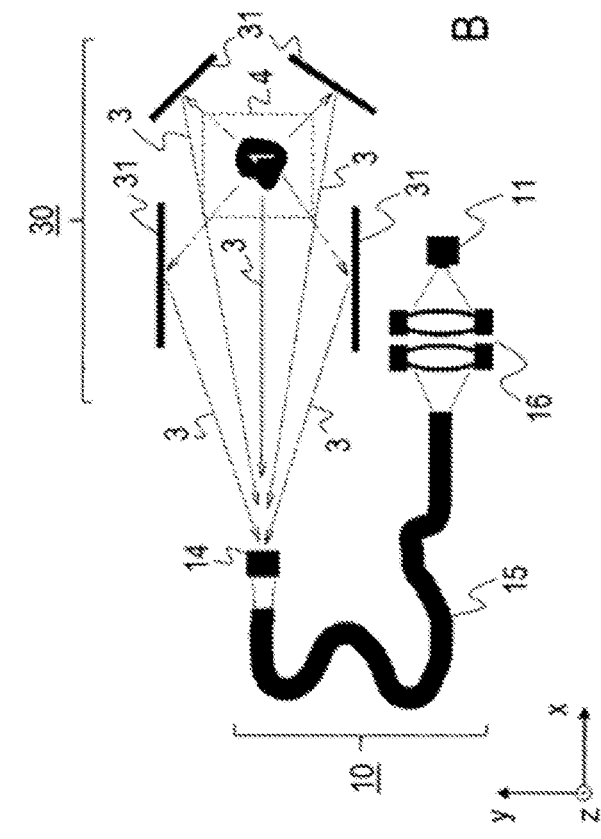
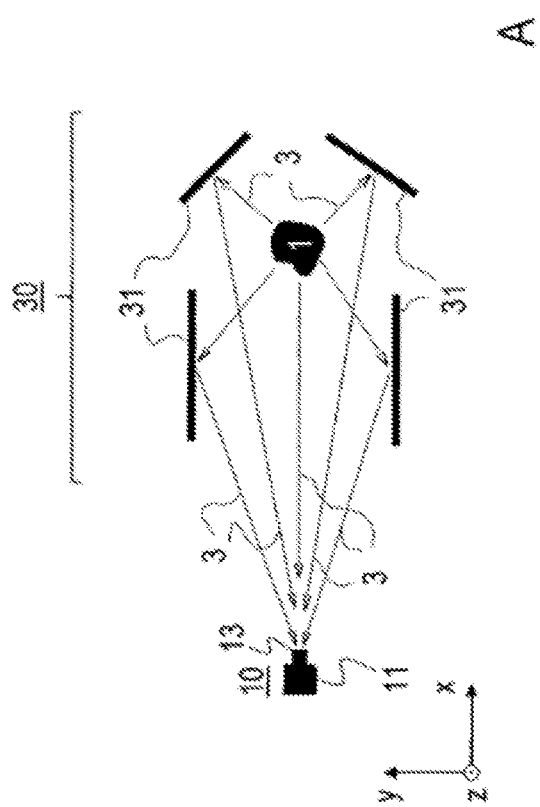
FIG. 8

MEASURING DEVICE AND METHODS FOR CHARACTERIZATION OF A RADIATION FIELD

CROSS REFERENCE TO RELATED APPLICATIONS

This is a continuation application, claiming priority to U.S. patent application Ser. No. 16/331,970, filed Mar. 10, 2019, which is in turn a 371 filing of PCT/EP2016/001607, filed Sep. 26, 2016. These applications are incorporated by reference in their entireties.

STATEMENT REGARDING FEDERALLY SPONSORED RESEARCH

Not applicable.

STATEMENT REGARDING MICROFICHE APPENDIX

Not applicable.

BACKGROUND

The invention relates to a radiation field measuring device and methods for characterizing a radiation field of electromagnetic radiation, more particularly of laser radiation.

It is generally known that the effectiveness and exactitude of radiation-based methods, e.g., for material processing or measurement purposes, depend upon the geometric properties and/or field properties of the radiation field that is used in the radiation-based method. For example, the effectiveness of material processing with laser radiation is influenced by the formation of a focus of the laser radiation on the surface of the material. Hence an examination (measurement) of radiation fields for ascertaining the properties thereof and optionally for guiding a radiation source such that the radiation field is generated with prespecified properties is generally of interest.

Standard methods for examining radiation fields comprise invasive methods and non-invasive methods. Invasive methods, such as capturing the radiation field directly with a camera, have the disadvantage that the application thereof alters the radiation field to be examined. As a result, a desired effect of the radiation field may be adversely impacted or even temporarily suspended. In online monitoring of laser cutting or welding units, for example, impacting or damaging the light distribution of a working beam should be avoided. Even if only part of the radiation field to be examined is separated and examined separately from a main beam (see DE 101 49 823 A1, for example), the optics used for the separation may adversely impact the application of the main beam because of dirt, for example.

Furthermore, invasive methods are limited to examining low power density radiation fields. Optics, for example mirrors, prisms, filters and/or lenses, in the beam path of the radiation field to be examined may be destroyed in the case of high power densities. For this reason, it is generally impossible to examine, for example, the radiation field directly in the focus of laser radiation with an invasive method. Lastly, invasive methods for measuring a radiation field, particularly in the case of monochromatic radiation (in the case of a CW laser, for example) tend to cause artefacts due to diffraction at defects or contaminations on the optics, e.g., on lens surfaces. This can lead to interferences, is nearly impossible to avoid, and adversely impacts the exactitude of the measurement.

Non-invasive methods have the advantage that they can be used particularly with high radiation intensities and that the radiation field to be examined is not affected by the measurement. U.S. Pat. No. 8,988,673 B2, for example, describes a non-invasive method in which the scattered light of a laser beam is recorded with a camera during passage through a gas in order to measure the shape of the pharoid beam (of the entire beam bundle). 2D scattered radiation images, which represent projections of the intensity distribution of the laser beam on planes parallel to the beam direction, are measured with this method.

The method according to U.S. Pat. No. 8,988,673 B2 has the disadvantage that neither transaxial 2D sections nor 3D volume reconstructions of the laser beam can be ascertained. A sequence of 2D projections of the radiation field, for instance by the repeated movement of a camera along a prespecified linear profile, could be achieved with the method according to U.S. Pat. No. 8,988,673 B2. However, measuring a single light pulse would not be possible with this method.

A general problem of standard techniques for examining radiation fields lies in the fact that these techniques are limited to the ascertaining of individual properties and are not suitable for a complete characterization of the radiation field by just one measurement. More particularly, there are no known non-invasive methods for simultaneously ascertaining a plurality of parameters (e.g., intensity distribution, caustics, $M^2$-parameters, beam propagation, wave front, wavelength and polarization properties, and/or beam shape) of the radiation field.

The simultaneous ascertainment of several properties of a radiation field has thus far only been possible through the combination or sequential application of different measurement methods, which increases the complexity of the examination. Furthermore, several measurements can exert negative influences on each other by their respective impacts on the radiation field, thereby adversely affecting or even precluding an exact representation of the radiation field. Lastly, the application of sequential measurements on invariable radiation fields would be limited and unsuitable for the examination of, for example, individual laser pulses or transient light distributions.

SUMMARY OF THE INVENTION

The object of the invention is to provide an improved radiation field measuring device and an improved method for characterizing a radiation field of electromagnetic radiation, particularly laser radiation, with which disadvantages of standard techniques are avoided. The invention should more particularly make it possible to ascertain more properties of a radiation field and/or to characterize the radiation field in a non-invasive manner with greater local resolution, precision and/or reproducibility, and/or to give rise to new applications of the characterization of a radiation field. In particular, an as complete as possible measurement and reconstruction of the radiation field should furthermore be achievable, ideally by using only one measurement method. More particularly, this should be achievable with an individual measurement or with several time-resolved individual measurements. The radiation field measuring device should furthermore be distinguished by a simplified technological design and/or an enhanced range of applications.

The method disclosed here is based on the capturing of scattered (stray) radiation that a radiation field generates in a medium. Applications of the invention lie in the monitoring and/or controlling of radiation sources, more particularly laser sources, for material processing, and of radiation-based methods, e.g., for material processing or measurement purposes.

Accordingly, a radiation field measuring device is described, which is configured for characterizing a radiation field that passes through a medium in a longitudinal direction. The radiation field measuring device may include a detector device having at least one detector camera, which contains at least one detector array arranged for the image recording of scattered radiation that is generated in the medium by the radiation field and is directed in a multiplicity of lateral directions that deviate from the longitudinal direction. The radiation field measuring device may also include a reconstruction device, which is configured for characterizing the radiation field on the basis of image signals of the detector device. In this radiation field measuring device, the reconstruction device may be configured for the tomographic reconstruction of a field density of the scattered radiation (3) in the radiation field.

A method for characterizing a radiation field is also disclosed. The radiation field may pass through a medium in a longitudinal direction, using a radiation field measuring device. The method may include image recording, by means of the detector device, of scattered radiation, which is generated in the medium by the radiation field and is directed in a multiplicity of lateral directions that deviate from the longitudinal direction. The method may further include characterizing the radiation field with the reconstruction device using image signals of the detector device. Within this method, the reconstruction device may carry out a tomographic reconstruction of a field density of the scattered radiation in the radiation field.

BRIEF DESCRIPTION OF THE DRAWINGS

Further details and advantages of the invention shall be described in the following, with reference to the appended drawings. Shown schematically are:

FIG. 2: an arrangement of reflector sections of the radiation field measurement device according to FIG. 1;

FIGS. 4 to 14: features of further embodiments of the radiation field measuring device according to the invention having different variants of a deflector device;

DETAILED DESCRIPTION

Figure 1:
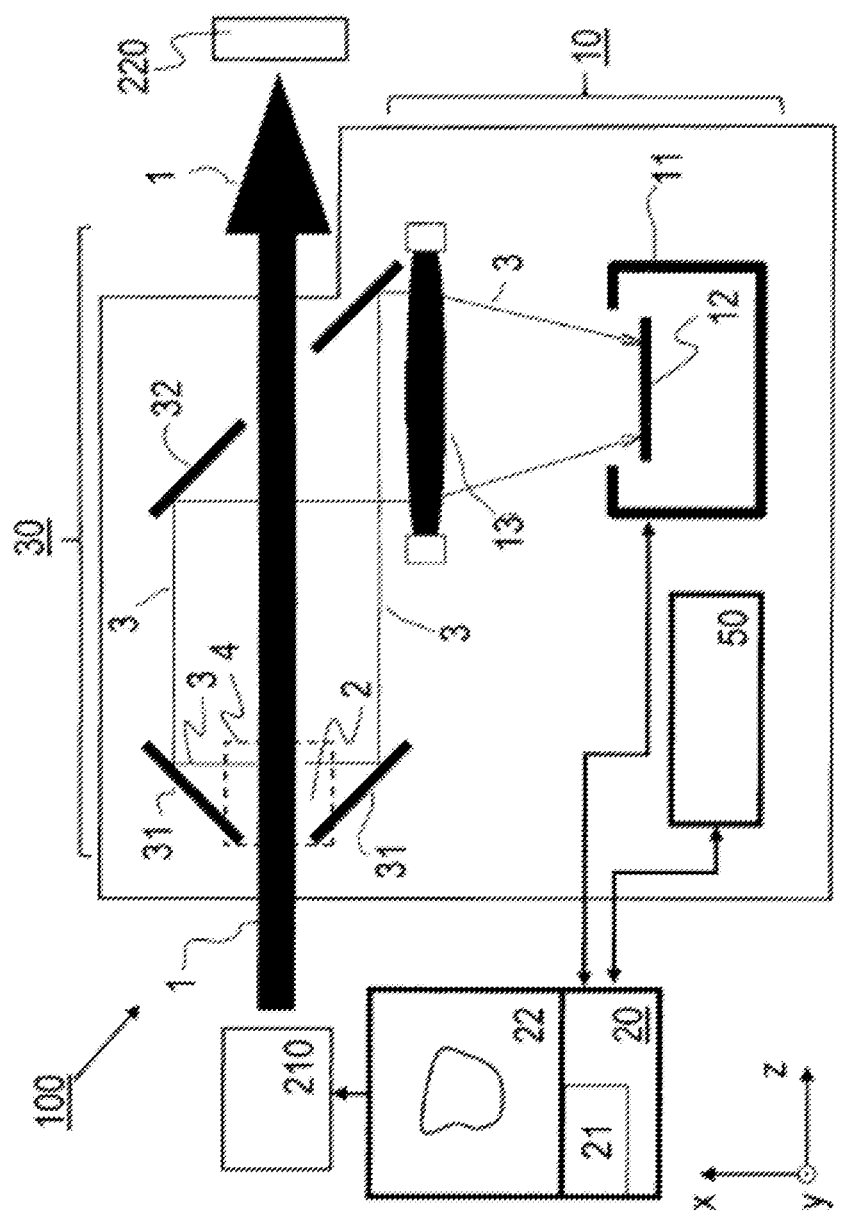
FIG. 1: a preferred embodiment of the radiation field measurement device according to the invention.

According to a first general aspect of the invention, said object is achieved with a radiation field measuring device (also called a scattered radiation tomograph) for the characterization of a radiation field that passes through a medium in a longitudinal direction (beam direction), which device comprises a detector device and a (tomography) reconstruction device.

The detector device has at least one detector camera with at least one detector array, which is arranged for the image recording of scattered radiation, which is generated in the medium by the radiation field and directed in a multiplicity of lateral directions (rotary directions) that deviate from the longitudinal direction.

According to the invention, the reconstruction device is configured for the characterization of the radiation field by means of a computer-tomographic, locally resolved reconstruction (denoted as tomographic reconstruction here) of a field density (energy or power density, spatial distribution) of the scattered radiation in the radiation field by using image signals of the detector device. The characterization of the radiation field generally comprises the determination of the field density of the scattered radiation and preferably the determination of beam parameters, in particular geometric beam parameters and/or field beam parameters, of the radiation field and/or the determination of a distribution of scattering particles in the medium.

The field density of the scattered radiation is a function of the intensity distribution in the radiation field and thus more particularly enables the provision of the sought-after beam parameters. In the event that Rayleigh scattering is generated from a monochromatic radiation field, the scattered radiation is proportional to the intensity distribution in the radiation field. For the case of a polychromatic radiation field, a proportionality also arises under the condition that the detected spectral distribution does not vary spatially in the measurement volume of the radiation field and more particularly that the intensity I of the radiation field can be factored according to $I(\lambda, r) = I_1(\lambda) * I_2(r)$. This condition can be fulfilled, for example, by equipping the detector device with a spectrally selective filter, which lets a partial spectral range of the radiation field through.

If the intensity of the scattering of the radiation field is a linear function of the intensity of the radiation field, the tomographic reconstruction then gives the 2D or 3D intensity distribution of the radiation field on the basis of the scattered radiation, excluding a calibration factor. In the case of other scattering processes, a quantitative correlation between the field density of the scattered radiation and the intensity distribution in the radiation field can also be established by calibration measurements or by applying scatter models.

According to a second general aspect of the invention, said object is achieved by the use of the radiation field measuring device according to the first general aspect of the invention for controlling a focus of the radiation field, capturing a temporal drift of an intensity profile of the radiation field, characterizing the radiation field of high energy lasers, laser-supported material processing in cutting and joining technologies, manufacturing in semiconductor technology, or therapy and/or surgery using laser radiation, and/or monitoring and/or controlling radiation-based processes, e.g., in controlling a radiation source, more particularly a laser source. According to the second aspect of the invention, in particular a control device for a radiation source, more particularly one comprising the tomography/reconstruction device, is deemed independent subject matter of the invention.

According to a third general aspect of the invention, said object is achieved by a method for the characterization of a radiation field passing through a medium in a longitudinal direction using a radiation field measuring device according to the first general aspect of the invention, wherein provision is made for an image recording of scattered radiation, which is generated in the medium by the radiation field and directed in a multiplicity of lateral directions that deviate from the longitudinal direction, by means of the detector device, and for a characterization of the radiation field with the reconstruction device using image signals of the detector device, and wherein the reconstruction device carries out a tomographic, locally resolved reconstruction of the field density of the scattered radiation in the radiation field.

The invention in general enables the characterization of a directed radiation field of incoherent radiation or coherent radiation (laser radiation). Provision is preferably made for the characterization of laser radiation, since this facilitates a reconstruction of the field density of scattered radiation with a high signal-to-noise ratio. The radiation field can be a continuous radiation field (continuous mode, CW mode) or a pulsed radiation field (pulse mode), wherein the power density of the scattered radiation is reconstructed as a field density in the continuous mode and the energy density of the scattered radiation is reconstructed as a field density in the pulse mode.

The scattered radiation is generated by the radiation field in the medium, which generally comprises a diffusing substance, particularly at least a gas (or vapor), for example air or other gaseous process medium or scattering gas, a liquid, a solid, a plasma, or a particle-containing composition such as a colloidal solution, an aerosol, smoke, or an emulsion. Depending upon the nature of the diffusing medium, the scattered radiation will be generated by, for example, Rayleigh scattering, Tyndall scattering, Mie scattering or scattering on free charge carriers. These scattering mechanisms are each distinguished by a specific distribution of the scattered radiation (e.g., shape of the scattering lobe or orientation relative to the longitudinal direction of the radiation field), which can be taken into account during the tomographic reconstruction of the field density. A calibration measurement can be used to determine the spatial characteristics of the scattered radiation.

The image signals of the detector device (scattered radiation images) provide projections of the scattered radiation in the captured lateral directions on the at least one detector array. The reconstruction device is configured to obtain, by means of tomographic reconstruction, at least one sectional image of the scattered radiation in the radiation field from the scattered radiation images, which are recorded from several different directions (the captured lateral directions) corresponding to a number of projections. The sectional image of the scattered radiation represents the field density of the scattered radiation in the radiation field, more particularly the spatial distribution of the scattered radiation in the radiation field, which is a qualitative and quantitative measure for the field distribution of the radiation field. The reconstruction device provides a three-dimensional model of the field distribution of the radiation field.

The limitations of standard techniques are advantageously avoided by the use of the scattered radiation tomograph in that the scattered radiation arising in the medium anyway based on, e.g., Rayleigh scattering of the radiation field or fluorescence on atoms or molecules of the medium, is used in order to characterize the radiation field in a comprehensive manner and with just one measurement. In particular, the imperfections of the standard scattered light 2D imaging method according to U.S. Pat. No. 8,988,673 B2 are remedied by the tomographic reconstruction of the radiation field, and a complete reconstruction of the radiation field is achieved in the measurement section of interest without disturbing the radiation distribution.

The following advantages of the invention also arise. A scattered radiation tomograph operates in a contact-free (i.e., non-invasive) manner so that the radiation distribution to be examined is not influenced by the measurement. The fact that dust particles and defects on optical components cannot interfere is particularly advantageous, since there are no such optical components in the beam path of the radiation field to be examined. Particularly high radiation intensities can be measured without damaging components of the scattered radiation tomograph. As an alternative, the scattered radiation tomograph can be configured for an invasive mode, for example if the examined radiation field is to be rotated in the optical setup used for the image recording of the scattered radiation or if the examined radiation field is to be split off from a main beam.

The invention enables a comprehensive measurement of the radiation field, in particular a three-dimensional reconstruction of the intensity profile of a radiation field in a measurement volume, and the derivation of a multiplicity of beam parameters from the same. The measurement can take place in a manner free of artefacts, more particularly free of interferences, silhouettes, and/or diffractions. The scattered radiation tomograph enables the reconstruction of the intensity profile of the examined radiation field, even for transient radiation fields and in particular for one-time radiation pulses. Advantageously, a plurality of transient phenomena of the radiation field can also be captured simultaneously in a measurement volume. The scattered radiation tomograph has a considerably simplified construction compared to the combination of standard measurement setups that would be required for a comprehensive characterization of the radiation field.

In contrast to the composite image measured in U.S. Pat. No. 8,988,673 B2, the invention advantageously provides a tomographic reconstruction of the radiation fields or the beam parameters thereof. The characterization of the radiation field is independent of the observation direction, since provision is made anyway for capturing the scattered radiation images from multiple angles for the tomographic reconstruction. The complete three-dimensional reconstruction of the intensity profile in a measurement section makes it possible to derive freely selectable two-dimensional intensity profiles along any sectional plane through the medium in the measurement section.

A further advantage of the invention lies in the fact that the characterization of the radiation field is made possible for radiation in different wavelength ranges. In this case the term "radiation" refers in particular to electromagnetic radiation with a wavelength in the x-ray, UV, VIS, NIR, IR or microwave range. The detector device is preferably configured for an image recording of the scattered radiation with a wavelength in the x-ray, UV, VIS, NIR, IR or microwave range in each respective case. Particular preference is given to characterizing laser radiation with a wavelength in the UV, VIS, NIR, or IR range. However, specific advantages also arise for other wavelength ranges. On the basis of the emission of the radiation arising in the recombination, it is thus possible to measure intensity distributions of ionizing radiation, for instance x-ray or XUV/UV radiation, which would damage or destroy standard radiation detectors.

Soft x-ray radiation, which is characterized with the method according to the invention, preferably has an energy of 0.1 to 1 keV. For example, for a wavelength in the range of 1 nm to 10 nm, which corresponds roughly to 1000 eV to 100 eV, the scattering and absorption in air is already comparable to the scattering of visible light in air. The characterization of x-ray radiation is of interest in, for example, applications in the semiconductor industry, in particular for microlithography, for which there are not any suitable non-invasive beam diagnosis methods as yet.

The reconstruction device is preferably configured for non-analytical, in particular algebraic or statistical, tomographic reconstruction of the field density of the scattered radiation. Particular preference is given to the tomographic reconstruction of the field density of the scattered radiation comprising an iterative algorithm.

Tomographic reconstruction with a non-analytical method has advantages over analytical methods in terms of the achievable quality and quantifiability of the reconstruction result, in particular because they are calculated in a more artefact-free manner and with better spatial resolution. For example, non-analytical methods can considerably reduce the sampling artefacts in the reconstruction result that would otherwise be expected for the sought-after low projection number. Furthermore, they generally enable all of the physical effects arising during the image acquisition and typically degrading the image quality to be taken into account. For example, these can be the characteristics of the imaging system (the so-called point spread function, PSF) or perhaps the occurrence of reflection/scattered radiation. Common to all non-analytical methods is the fact that they discretize the space, and consequently also the reconstruction result and the measurement data, at the outset. This means that the reconstruction result to be determined is broken down into a multiplicity of three-dimensional voxels by the discretization of the space, and that the measurement data are accordingly broken down into a multiplicity of two-dimensional pixels.

Algebraic reconstruction methods constitute a first subgroup of non-analytical reconstruction methods. They invert a linear equation system or determine the pseudoinverse (Moore-Penrose inverse) thereof. Because of the high dimensionality of the assigned task, the numerous algebraic reconstruction methods are implemented iteratively, for example with ART, MART, or SMART algorithms.

Tomographic reconstruction is preferably performed with a second subgroup of non-analytical reconstruction methods, namely the statistical reconstruction methods. These methods are likewise essentially implemented iteratively. In particular, they have advantages in terms of reconstruction based on noisy image recordings of scattered radiation (measurement data (y)). For example, the Poisson noise of the measurement data, which can arise as a result of the low intensity of the scattered radiation, can be taken into account implicitly. Statistical methods are based on the formulation of a high-dimensional goal or cost functional $F(f)$, which assumes a minimum, ideally a global one, for a specific choice of voxel values. The totality of these same voxel values for which the cost functional is minimized represents the reconstruction result f. There are numerous applicable statistical, iterative reconstruction methods according to the type of formulation of the goal functional and the type of iterative calculation rule (algorithm) for the search of the goal functional minimum.

The goal functional $F(f)$ consists of at least two components. In the context of the noise characteristics of the measurement data y, the tomographic data mismatch term $L(y, A\,f)$ that formulates the imaging requires that the forward projections of f, calculated by applying a system matrix A to f, A f, coincide with measurement values y. The system matrix A thus formulates the measurement geometry and basically takes all physical effects of the measurement value creation into account. The maximum likelihood term, which takes the typically-arising Poisson noise characteristics of the scattered radiation into account, is preferably used as the tomographic data mismatch term.

The second component of the goal functional is provided because the formulation of the goal functional solely by the data mismatch term is a so-called ill-posed problem, which generally leads to a noise amplification of the reconstruction result in course of the iterative minimization process. The goal functional is therefore preferably supplemented with a Bayesian regularization term $R(f)$, which is based on prior knowledge of spatial relationships of the voxel values of the reconstruction result.

Statistical tomographic reconstruction using scattered radiation images is preferably carried out in a manner analogous to the tomographic reconstruction of emission tomographic measurement data, which is described in U.S. Pat. No. 8,559,690. Accordingly, the goal functional to be minimized is preferably supplemented by a third term. The latter is an Lp-norm term with (0≤p<2), in particular an L1-norm term: $\|T^T f\|_1$, which amplifies the sparseness, or else at least the compressibility, of f. Because the compressibility of f is generally not provided in the spatial domain, f is transformed by means of $T^T$ into a sparse or else at least compressed representation, for instance by applying a three-dimensional wavelet transformation, which is furthermore selected such that it is as incoherent as possible with respect to the system matrix A. The compressive sensing paradigm, which enables a substantial reduction of the number of individual measurements of the scattered radiation at different angles needed for an artefact-free reconstruction, is advantageously associated with the plugging-in of this term.

The goal functional to be minimized is therefore preferably formulated as follows:

$$F(f)=L(y, A\ F)+\alpha\|T^T f\|_1+\beta R(f),$$

wherein $\alpha$ and $\beta$ are factors that specify the effect of the respective goal functional components. The algorithm to be used for minimizing the goal functional can be freely chosen, provided that it adequately accounts for the numerically demanding L1-norm term. This applies in particular to the requirement that the voxel values must fulfill the boundary condition $f \geq 0$. Preference is therefore given to using a so-called "Alternating Direction Method of Multipliers" (ADMM) algorithm.

The characterization of the radiation field preferably comprises the determination of the beam parameters in a particle-free medium. However, under practical application conditions dust particles in the measurement section can cause artefacts and interferences of the reconstruction. For capturing Rayleigh scattering, provision is therefore preferably made for eliminating dust and Mie scattering events in the medium. According to a particularly advantageous embodiment of the invention, a purely statistical approach is preferably used for detecting and if need be eliminating dust and Mie scattering events in the medium. With this approach, several scattered radiation images are recorded sequentially and artefact-bearing scattering events arising from particles in the medium are eliminated by a statistical analysis of the series of scattered radiation images. This approach is thus based on effective reconciliation of several sequential individual measurements, and it advantageously does not need any predefined parameters. According to an alternative variant of the invention, provision can be made for reconstruction of the field density of the scattered radiation, with particles in the medium taken into account that would otherwise lead to artefacts of the reconstructed field density.

For a radiation field that remains stationary for a sufficient time, the measurement associated with each projection direction could be performed multiple times. If the repetition frequency of the multiple measurement is adapted to the mean movement velocity of the dust particles, transient scattering events will be effectively eliminated by a median operation carried out in a pixelwise manner. The projection images supplied to the tomographic reconstruction will simultaneously be denoised.

The application of the invention is not limited to the use of non-analytical methods. Alternatively, use can be made of analytical methods, which are characterized by the fact that they perceive reconstruction results and measurement data as continuous functions and directly solve an integral equation that implicitly simplifies the projection process. Examples of such include filtered back projection (FBP) and convolution back projection (CBP).

The tomographic reconstruction can advantageously be carried out such that the illumination background determined using a reference measurement is implicitly taken into account in the scope of a forward and backward projection process of the tomographic reconstruction rather than subtracted from the scattered radiation images (projections). The current illumination background can comprise, for example, an exterior illumination if the medium in the measurement volume cannot be completely screened from outside incident light, and/or secondary scattering of the Rayleigh scattering on objects near the measurement setup. In the latter case, the secondary scattering, which is overshone by the radiation field itself in the projection area of the radiation field, is estimated in this projection area by interpolation.

The lateral directions in which the scattered radiation images are recorded run perpendicular to the longitudinal direction, wherein in this case they represent the radial directions, or at an angle greater than or less than 90° relative to the longitudinal direction.

According to another preferred embodiment of the invention, the at least one detector array for the image recording of scattered radiation is arranged such that the lateral angles are distributed in such a way that the components of the recorded scattered radiation span a measurement range of 180° to 360° perpendicular to the longitudinal direction.

If the scattering medium weakens the scattered radiation en route to the radiation field measuring device homogeneously or inhomogeneously inside and/or outside of the radiation field, the scattered radiation is preferably captured from lateral directions selected such that the respective components thereof are distributed over 360° perpendicular to the longitudinal direction of the radiation field. If the weakening of the scattered radiation by the scattering medium en route to the radiation field measuring device is negligible, the scattered radiation is preferably captured from lateral directions selected such that the respective components thereof are distributed over 180° perpendicular to the longitudinal direction of the radiation field.

Preference is given to measuring the scattered radiation in lateral directions, the components of which are uniformly distributed over the measurement range perpendicular to the longitudinal direction, except in the case of an even number of lateral directions, the components of which are to be distributed over 360° perpendicular to the longitudinal direction. In this case, they are preferably distributed unevenly over the measurement region. In this manner the recording of redundant image information of the scattered radiation is advantageously avoided, and the number of lateral directions that are required for a specific application of the invention for characterizing the radiation field can be minimized.

Advantageously, the radiation field can be characterized using scattered radiation images that were recorded in only two different lateral directions (lateral angle not equal to 180°, preferably equal to 90°). As an alternative, scattered radiation images are recorded along at least three lateral directions, more particularly at least four (for a measurement range of 180°) or at least five (for a measurement range of 360°) lateral directions and undergo tomographic reconstruction.

According to a preferred variant of the invention, the detector device for the image recording of scattered radiation is arranged perpendicular to the longitudinal direction. In this case, advantages can arise due to the available space and the alignment of the detector device relative to the longitudinal direction. According to an alternative variant of the invention, the image recording can take place at an angle greater than or less than 90° relative to the longitudinal direction, wherein advantages arise due to an increase of the scattering intensity if the angle of the lateral direction of the image recording relative to the longitudinal direction decreases or increases.

If the detector device is configured according to another embodiment of the invention for a spectrally selective image recording of the scattered radiation, i.e., scattered radiation images are only recorded within a limited spectral range with the detector device, advantages can arise in terms of an improved suppression of interfering external radiation and an improved signal-to-noise ratio of the reconstruction. The detector device can be equipped with, for example, at least one suitable filter, which permits the passage of the desired spectral range. Another advantage of the spectrally selective image recording of scattered radiation lies in the simplification of the reconstruction of polychromatic radiation fields.

Advantageously, there are various possibilities for reconstructing the field density in a measurement section of the radiation field to be examined. According to a first variant, a planar layer-like section (layer section) of the radiation field is captured. Because the layer has a finite thickness, the reconstructed field density is captured as a volumetric quantity. The layer section can be perpendicular or inclined relative to the longitudinal direction. The thickness of the layer section is preferably selected such that the field density within the layer is approximately constant. In this variant, the reconstruction device is configured for the tomographic reconstruction of a transverse or inclined layer of the field density of the scattered radiation in the layer section with finite thickness of the radiation field.

A conventional, invasive beam profile measuring device generally captures a two-dimensional intensity distribution of the radiation field perpendicular to the longitudinal direction thereof. With the layer suitably oriented, the inventively reconstructed volumetric field density of the scattered radiation can also be transformed into a two-dimensional intensity distribution by integrating the field density of each voxel in the longitudinal direction of the radiation field and then multiplying by a conversion factor.

Determining the two-dimensional intensity distribution from just a single reconstructed layer of the field density of the scattered radiation has advantages in terms of less apparatus and calculation complexity compared to a measurement and reconstruction extending over a plurality of layers. Accordingly, the detector device can preferably comprise linear detector arrays with which linear scattered radiation images are recorded. This advantageously gives rise to a simplified construction of the detector device.

According to a second variant, a three-dimensional, typically cylinder-shaped or truncated cone-shaped volume section of the radiation field is captured, which consists of a plurality of layers of finite thickness or of voxels arranged in another volumetrically suitable way. In this case, the reconstruction device is configured for the tomographic reconstruction of the field density of the scattered radiation in the entire three-dimensional volume section, which forms itself in each dimension by the juxtaposition of voxels. In this embodiment of the invention, the detector device preferably comprises planar detector arrays. The volume section is more particularly composed of at least two juxtaposed layer sections, preferably juxtaposed in a longitudinal direction. The volume section can be characterized by a field density that is variable in a longitudinal direction.

Advantageously, there are also different possibilities for configuring the detector device. According to a first variant, the detector device can comprise a plurality of detector cameras, which are each equipped with at least one detector array. In this case, an associated detector camera is provided for each lateral direction in which a scattered radiation image is to be recorded. Each detector camera produces a scattered radiation image for one of the lateral directions so that advantages arise if the scattered radiation images are to be recorded directly and without additional optical elements.

According to a second variant, the detector device can comprise a single detector camera, which contains a multiplicity of detector arrays, which are each arranged in one of the lateral directions for the image recording of scattered radiation. The detector arrays can comprise, for example, separate arrays, e.g., CCD chips, or preferably sections of a common array, e.g., CCD chips. This embodiment of the invention has the advantage of a simplified construction and operation of the detector device.

If according to another preferred embodiment of the invention provision is made of a deflector device, which is arranged for deflecting the scattered radiation along the multiplicity of lateral directions onto the plurality of detector cameras or onto the single detector camera, advantages can arise in terms of the positioning of the at least one detector camera, in particular at a distance from and/or jointly on a side of the radiation field. The deflector device comprises optical elements, particularly preferably at least one catoptric element (particularly mirrors) and/or at least one dioptric element (particularly prisms and/or lenses), with which the beam path of the scattered radiation from one of the lateral directions to the associated detector camera is spanned in each case. The optical elements can be designed for displaying the scattered radiation on the at least one detector camera.

The deflector device can advantageously comprise a plurality of catoptric elements, in particular a plurality of reflector sections, which are each arranged for deflecting the scattered radiation along one of the lateral directions toward one of the detector arrays. The reflector sections are preferably individual, planar or imaging mirrors or are connected to an axicon reflector, which is arranged axialsymmetrically to the longitudinal direction. The individual mirrors have advantages in terms of the optimizable alignment of the individual beam paths, whereas the measurement setup is advantageously simplified with the axicon reflector.

If the detector device comprises a single detector camera with a plurality of detector arrays, a collection reflector is preferably provided as a further catoptric element, which collects beam paths from the lateral directions via the reflector sections and directs them to the detector camera. The collection reflector has the advantage of simplifying the alignment of the detector camera relative to the reflector sections.

According to another preferred embodiment of the invention, the radiation field measuring device can be equipped with a beam rotator, which has a rotatable prism, in particular a Dove prism, and/or a rotatable mirror and which is configured for rotating the radiation field about the longitudinal direction. In this case, the detector device contains a single detector camera, which is arranged for the image recording of scattered radiation. For the recording of scattered radiation images in the multiplicity of lateral directions, the radiation field is rotated with the beam rotator into various rotation positions relative to the detector camera. It should be noted that this embodiment is designed for a nondestructive measurement, i.e., it permits the simultaneity of measurement on the radiation field and primary application of the radiation field. However, this embodiment is only usable with radiation field intensities that permit the use of the rotatable prism and/or mirror.

According to a particularly preferred embodiment of the invention, the characterization of the radiation field comprises the determination of beam parameters directly from the tomographically reconstructed field density of the scattered radiation. Preference is given to providing an analyzer device, which is part of the reconstruction device or arranged separately therefrom and which determines at least one beam parameter of the radiation field from the field density of the scattered radiation. Advantageously, the analyzer device can be used to calculate at least one of the following beam parameters: field-beam parameters, e.g., the pulse energy or pulse energy density of the radiation field in the case of pulsed radiation, the field density of the radiation field in the case of continuous radiation, coherence properties of the radiation field, wave fronts of the radiation field, Rayleigh lengths of the radiation field, or diffraction indexes, $M^2$ parameters and beam propagation factors k of the radiation field, and/or geometric beam parameters such as geometric properties of the radiation field, in particular beam diameter, divergence angle and/or beam shape, properties of the beam waist of the radiation field, in particular the radius, position along the longitudinal direction, and/or shape of the focus in transaxial section, and/or the spatial location of the radiation field in the medium. The beam parameters can advantageously be determined individually, in subgroups, or in their entirety from a single measurement of the radiation field.

If the analyzer device is configured according to another embodiment of the invention for a continuous determination of the at least one beam parameter and the temporal stability thereof, advantages arise in terms of the continuous monitoring of the radiation field and optionally the controlling of a beam source for generating the radiation field.

According to another variant of the invention, the analyzer device can be configured for calculating beam properties, which are derived from the determined beam parameters. A preferred example is the calculation of beam propagation, in particular by means of a wave front analysis. In an examination of the radiation field in a measurement section spaced apart from a radiation field action site on a material, calculating the beam propagation enables beam parameters to be determined at the action site. For example, the focus of the radiation field can be characterized and the position of the focus can be ascertained, even if the scattered radiation images used for the tomographic reconstruction are recorded outside of the focus.

According to another advantageous embodiment of the invention, the radiation field measuring device can be equipped with a particle removal device, which is configured for providing the medium in a particle-free state in the measurement section of the radiation field measuring device. The particle removal device has the advantage of removing dust particles from the measurement section, which could otherwise cause artefacts and interferences of the reconstruction. Advantageously, various technical measures for removing dust particles are available, for example electrostatic filters, mechanical filters for generating a constant particle-free medium flow through the measurement section, and/or purging gas sources for the provision of purified media or of a purging gas for the measurement section.

According to another application of the invention, the reconstruction of the field density of the scattered radiation can be used to determine a volumetric particle distribution in the radiation field. In this case, interim results of the inventively applied reconstruction advantageously provide information on the presence, the spatial distribution, the shape and the size distribution of scattering particles in the examined radiation field. Particle spectra can in turn be derived from the latter.

According to a particularly preferred embodiment of the method according to the invention, provision is made for a monitoring and/or controlling of a radiation source with which the examined radiation field is generated. Determined beam parameters of the radiation field are used to monitor the operation mode of the radiation source and optionally to adjust it and/or stabilize it by means of a control circuit. The radiation source is preferably a laser source, which is configured, for example, for a laser-supported material processing in cutting and joining technologies or for a manufacturing technique in semiconductor technology or a laser-supported surgical technique.

The setting and optional regulation of the radiation source can comprise, for example, actuation of a focusing device of the radiation source according to the determined position of the focus of the radiation field along the longitudinal direction in such a way that the focus is set to a predefined working position, e.g., on the surface of a material to be processed.

As an alternative or in addition, the radiation source can contain a setting device with which beam parameters of the radiation field are alterable, wherein in this case the setting device is controlled according to a determined beam parameter, particularly preferably according to an intensity profile of the radiation field along the longitudinal direction, particularly in the focus of the radiation field.

Features of preferred embodiments of the invention shall now be described in the following, with reference to the examination of radiation fields of light (light fields) as an example, which comprise, for example, continuous or pulsed laser light or non-coherent light, in particular in the UV, VIS, or IR wavelength range, with tomographic reconstruction using scattered light images. Accordingly, optical elements of the radiation field measuring device comprise in particular mirrors, lenses and/or prisms. However, the practical implementation of the invention is not limited to the characterization of light, but is also possible for radiation fields of other wavelengths, for example x-ray radiation. In these cases, the optical elements are replaced as needed with suitable elements for beam deflection and/or imaging such as x-ray optics, multilayer mirrors or mirror arrangements with grazing incidence, for example, and the detector camera(s) comprise(s), for example, CCD cameras with convertor layers or cameras with image convertor tubes.

The radiation field measuring device and methods for operating the same are also described, particularly in terms of the collection of scattered light images and the construction of the detector device. Details of the reconstruction method are achievable in the manner known from standard methods of emission tomography, particularly according to U.S. Pat. No. 8,559,690.

In preferred embodiments of the invention, scattered light images can be collected using a deflector device having catoptric and/or dioptric elements. Accordingly, features of embodiments of the invention having catoptric elements are also achievable using dioptric elements (and vice versa). For example, the effects of reflector sections are achievable using optical lenses. However, catoptric elements such as mirrors, for example, have advantages because they do not have any color errors and can be more easily adapted to an elliptical arrangement with beam diversion. Compared to lens or prism assemblies or to the use of a single detector camera, multi-mirror arrangements having several reflector sections furthermore have the advantage of a high spatial angle coverage.

FIG. 1 shows, in schematic form, a first embodiment of the radiation field measuring device 100 according to the invention for the characterization of a light field 1, having a detector device 10, a deflector device 30 and a reconstruction device 20. In this embodiment, the detector device 10 comprises a single detector camera 11. The radiation field measuring device 100 is provided for the characterization of the light field 1 of a laser beam, which is generated for the purpose of material processing with a laser source 210, e.g., a $CO_2$ laser, a Nd-YAG laser or a disc laser, and focused on the surface of a workpiece 220. For example, the mode structure and output of the light field 1 and the position of a focus on the surface of the workpiece 220 should be ascertained and optionally controlled. The light path of the light field 1 runs with a beam direction (designated here as longitudinal direction z) through a measurement section 4 containing a medium 2 such as air, for example. In the measurement section 4 the light field 1 has a cross sectional dimension of, for example, 10 µm to 10 cm, typically 1 mm to 10 mm.

FIG. 1 shows the examination of the light field 1, which is generated directly by the laser source 210. As an alternative, if the field density of the radiation is sufficiently low, a beam splitter can be used to split the light field 1 off from a main beam, which is directed to the material to be processed.

The light field 1 is scattered on the molecules of the medium 2, thus generating scattered light 3. The scattered light 3 is radiated in and opposite and laterally to the longitudinal direction z, with components in the x-y plane. In the case of predetermined lateral directions, part of the scattered light 3 is collected by the deflector device 30 (see FIG. 2A) and directed toward the detector camera 11 of the detector device 10. With the detector camera 11, scattered light images 6 of the scattered light 3 generated in the light field 1 are recorded along the lateral directions (see FIG. 2B).

The deflector device 30 comprises reflector sections 31 and a collection reflector 32 in the form of planar mirrors, which in the example illustrated are inclined at a 45° angle relative to the longitudinal direction z. For example, provision is made of four reflector sections 31, which reflect scattered light 3 from the light field 1 in four lateral directions 5 to the collection reflector 32. The lateral directions 5 are arranged in a preferably unevenly distributed manner at different lateral angles with respect to the x-y plane, as shown schematically in FIG. 2A. From each reflector section 31, an image of the scattered light 3 generated in the light field 1 is reflected to the detector camera 11 via the collection reflector 32. The reflector sections 31 have advantages in terms of preventing background noise from secondary scattering, as the latter is conducted out of the arrangement of reflector sections 31.

The detector device 10 comprises a single detector camera 11 having a detector array 12, e.g., a Sony ICX285 CCD chip, and a camera objective 13. The scattered light images 6 can be recorded with a uniform detector array 12. Pixel groups of the detector array 12 provide a plurality of linear detector arrays or a plurality of planar detector arrays for the image recording of the scattered light 3. As an alternative, single, separate detector arrays can be provided for the image recording of the scattered light 3. The detector device 10 can be equipped with a color-sensitive detector array 12 and/or a spectrally selective filter device (not illustrated) for a spectrally selective image recording of the scattered light 3. With the camera objective 13, the detector camera 11 displays the two-dimensional intensity distribution of the scattered light 3 in the area of the light field 1 via the planar mirrors of the reflector sections 31 and of the collection reflector 32. The boundary lines of the scattered light 3 give an impression of the pharoid beam path of the viewing field of the camera. A plurality of views of the scattered light of the light field 1 from different lateral directions are thus displayed on the detector array 12 via the various mirrors. As shown schematically in FIG. 2B, for example, four scattered light images 6 are generated on the detector array 12 with the camera objective 13. The detector camera 11 sends an image signal representing the scattered light images 6 to the reconstruction device 20.

The reconstruction device 20 comprises a computer unit, which is designed to carry out a computer tomographic reconstruction process on the basis of the image signals of the detector camera 11. The reconstruction device 20 calculates the field density of the scattered light 3 in the light field 1 from the scattered light images 6 and the known geometry of the deflector device 30, in particular the distribution of the lateral angles 5 of the reflector sections 31.

The tomographic reconstruction yields a three-dimensional model (3D data set) of the intensity distribution of the scattered light 3 in the displayed volume area of the light field 1. This three-dimensional intensity distribution of the scattered light 3 is a function of the local radiation intensity of the light field to be measured. The intensity distribution model characterizes the spatial brightness distribution of the light field, and it advantageously contains considerably more information about the light field 1 than any of the projective two-dimensional camera views and more information than a series of two-dimensional intensity projections of the measurement area of the light field 1 than can be measured according to U.S. Pat. No. 8,988,673 B2, and even more information than a series of intensity profiles measured invasively and directly with an imaging detector standing perpendicular to the z axis.

FIG. 1 furthermore shows that the reconstruction device 20 can be equipped with an analyzer device 21 and a display device. With the analyzer device 21, it is possible to calculate additional beam parameters (e.g., the intensity or the location of the focus) using the three-dimensional field density of the scattered light 3 in the light field 1. The determined parameters can be used as error values for regulating the laser source 210 in order to set prespecified beam parameters, which are predefined by, for example, a schematically shown control device 50.

Figure 3:
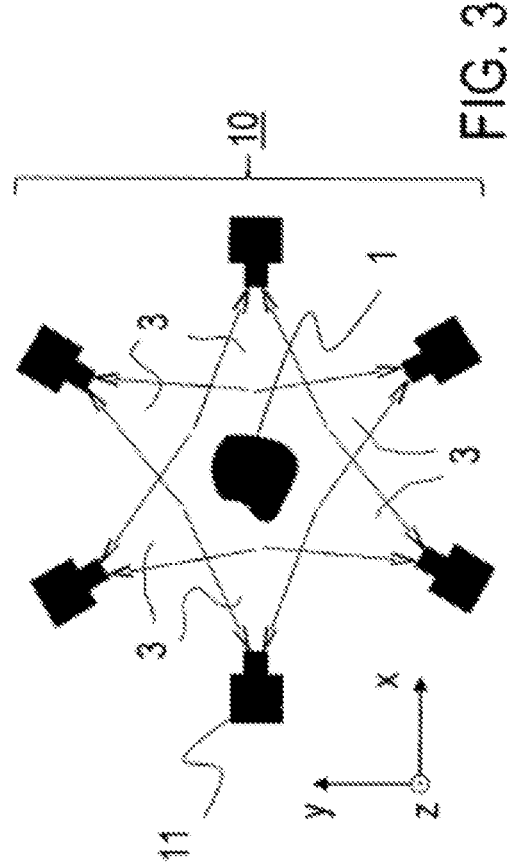
FIG. 3: an arrangement of detector cameras for recording scattered radiation images.

Shown schematically in FIG. 3 are features of another embodiment of the radiation field measuring device with a detector device 10, which has a plurality of detector cameras 11 (multi-camera arrangement). The detector cameras 11 are uniformly distributed in radial directions around the light field 1. Provision can be made for a non-uniform distribution of the detector cameras 11 as an alternative. Each of the detector cameras 11 is arranged for recording a scattered light image of the light field 1. In this case, it is possible to dispense with the deflector device 30 shown in FIG. 1. Instead of several partial images, several individual camera images from different lateral directions form on the detector array 12 (FIG. 2B). The image signals of the detector cameras 11 undergo tomographic reconstruction in a reconstruction device (not shown in FIG. 3).

Figure 4:
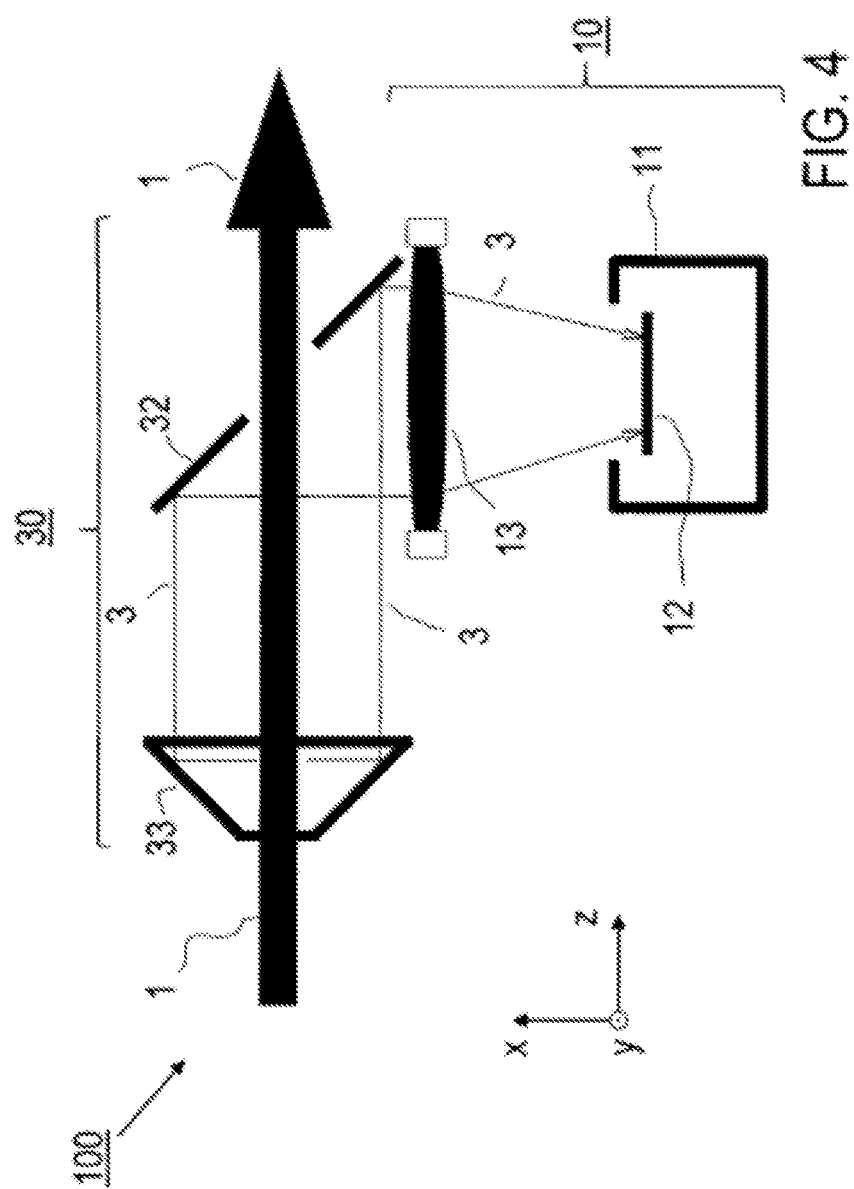

FIG. 4 shows a variant of the embodiment of the radiation field measuring device 100 according to the invention having a single detector camera 11 (FIG. 1), in which the arrangement of reflector sections 31 of the deflector device 30 is replaced with an axicon reflector 33 (single hollow cone-shaped reflector). The axicon reflector 33 is designed such that numerous images of the scattered light 3 of the light field 1 are displayed from various lateral directions on the detector array 12. The use of the axicon reflector 33 confers further advantages in connection with compressive sensing (CS), since the axicon measurements account for the "incoherence" required in the CS sense in that they display the projection of the scattered radiation of the radiation field, along the longitudinal extension thereof, in the beam direction with continuously increasing spatial resolution.

FIG. 4 notwithstanding, the axicon reflector 33 can be replaced by two axicon partial reflectors, which are obtained by dividing the axicon reflector 33 in half in the longitudinal direction of the light field 1 and putting the halves together, wherein one partial reflector is rotated 180°. This variant of the invention can offer advantages by compensating potential non-uniform spatial resolution on the axicon reflector 33.

Figure 5:
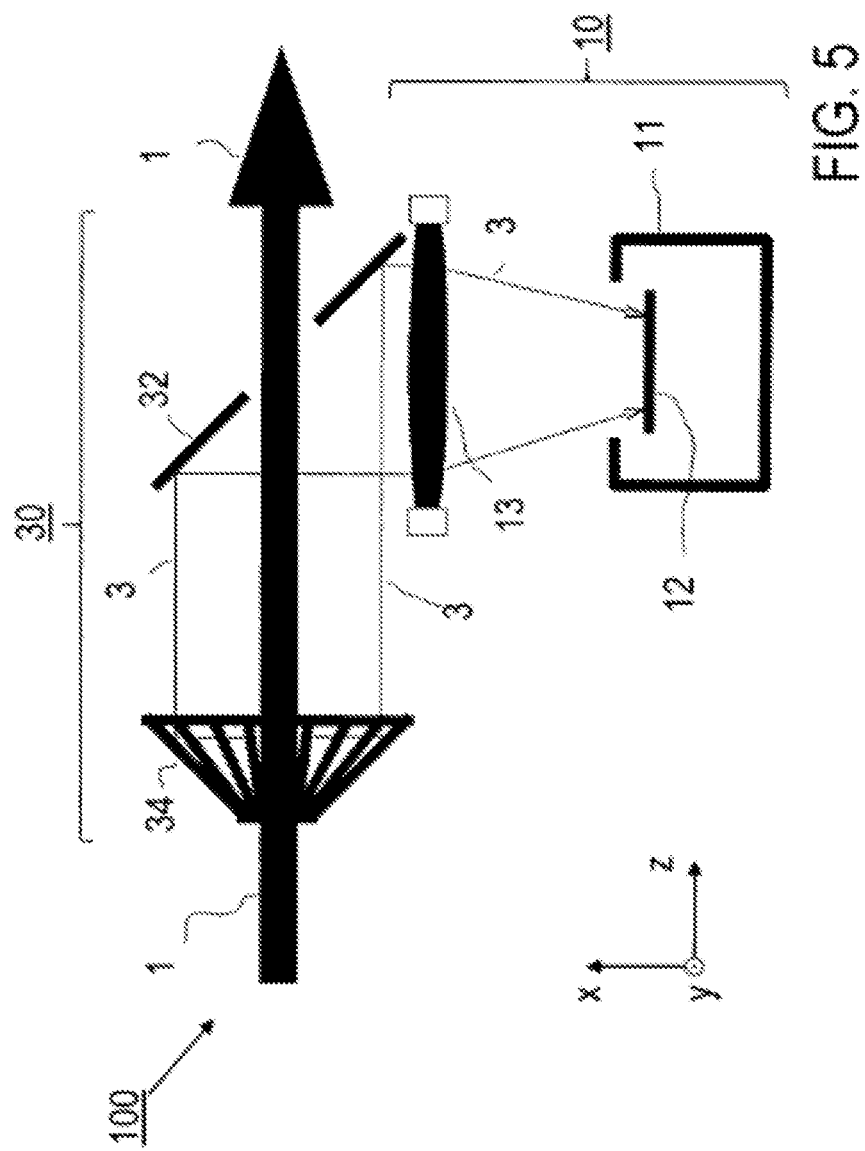

Another variant of the radiation field measuring device 100 with a single detector camera 11 is shown in FIG. 5, in which the axiom reflector is replaced by an arrangement of strip-type planar mirrors 34, which are arranged fan-like on a hollow cone surface. In this case, numerous images of the scattered light 3 of the light field 1 are generated on the detector array 12 from different lateral directions.

Figure 6:
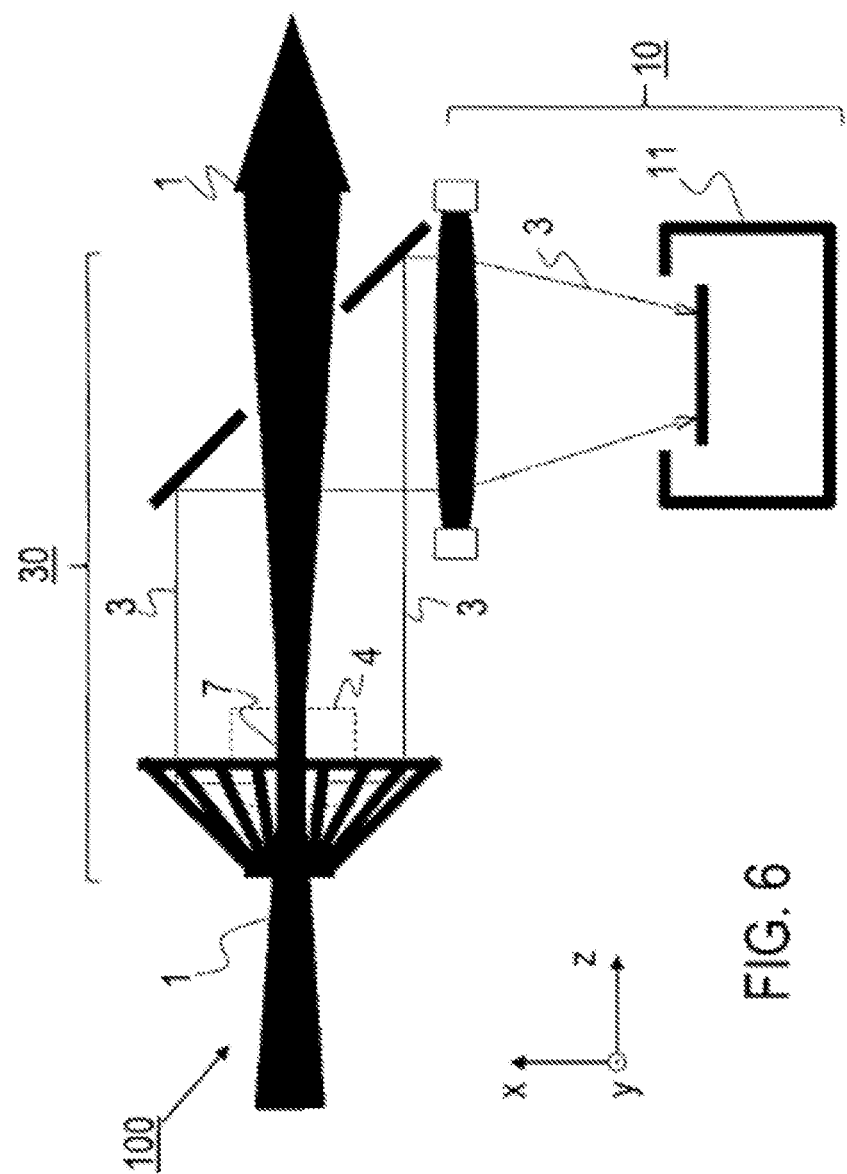
Figure 7:
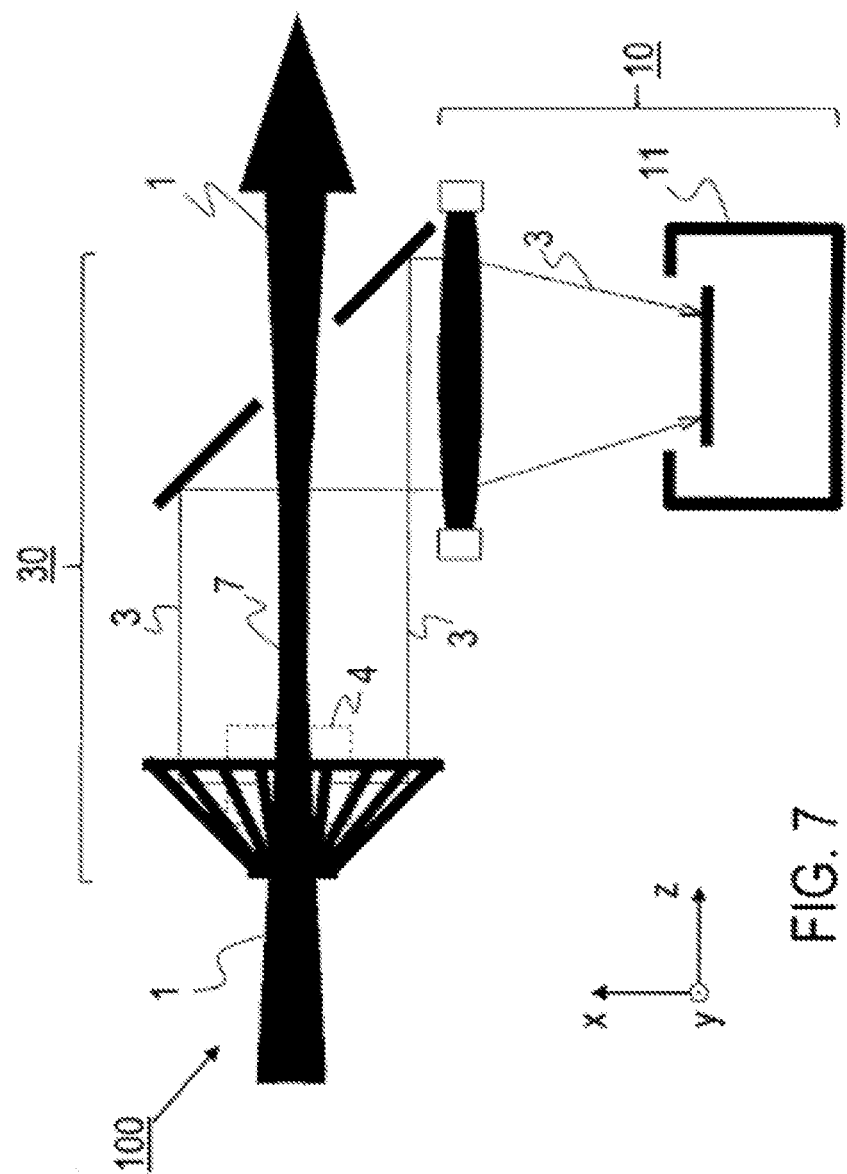

FIGS. 6 and 7 illustrate the application of the embodiment according to FIG. 5 for the characterization of a non-collimated light field 1. The diameter of the light field 1 passes through a minimum at a focus 7. According to FIG. 6, the scattered light 3 from the measurement section 4, which contains the focus 7, is diverted to the detector camera 11 by the deflector device. The tomographic reconstruction of the field density of the scattered light 3 in the light field 1 directly yields a characterization of the focus 7. As an alternative, the scattered light 3 can be captured in a measurement section 4 at a distance from the focus 7, as shown in FIG. 7. The three-dimensional reconstruction of the field density of the scattered light 3 permits a wave front analysis and ascertainment of the propagation properties of the light field 1, in particular the geometric form thereof, and thus indirectly also yields a characterization of the focus 7 and the position thereof. The embodiment of FIG. 7 can be modified so that the focus 7 is located outside of the deflector device 30. The focus 7 on, for example, the surface of a material to be processed can thus be advantageously examined in a contact-free and non-invasive manner.

Features of a modified embodiment of a radiation field measuring device according to the invention are shown in FIGS. 8A and 8B, in which the longitudinal direction z of the light field 1 runs perpendicular to the drawing plane. In both cases provision is made of a deflector device 30 having a plurality of reflector sections 31 (planar mirrors), which divert scattered light 3 from the light field 1 to the detector camera 11 of the detector device 10. For example, four reflector sections 31 are provided.

The reflector sections 31 are arranged with surfaces parallel to the longitudinal direction z such that a center line of each reflector section 31 forms a tangent to an ellipse in the x-y plane, wherein the detector camera 11 (FIG. 8A) or an imaging objective 14 of a flexible or rigid image conducting fiber bundle 15 (FIG. 8B) is located in one focus of the ellipse and the light field 1 is located in the other focus of the ellipse. Five different lateral directions and accordingly five different scattered light images arise in conjunction with the direct camera perspective on the light field 1. According to FIG. 8A, the scattered light images are simultaneously recorded with the detector camera 11 directly via the camera objective 13. According to FIG. 8B, the scattered light images are recorded with the detector camera 11 without an objective via the imaging objective 14, the image conducting fiber bundle (light wave conductor bundle with aligned fibers) 15 and a relay optic 16. The image signals of the detector camera 11, which contain the scattered light images, are sent to the reconstruction device (not illustrated).

The embodiment according to FIG. 8B has the advantage that the detector camera 11 can be arranged at a distance from the measurement section 4 so that interfering conditions in the measurement section 4 (electromagnetic interference fields or extreme temperatures, for example) cannot affect the detector camera 11.

Figure 9:
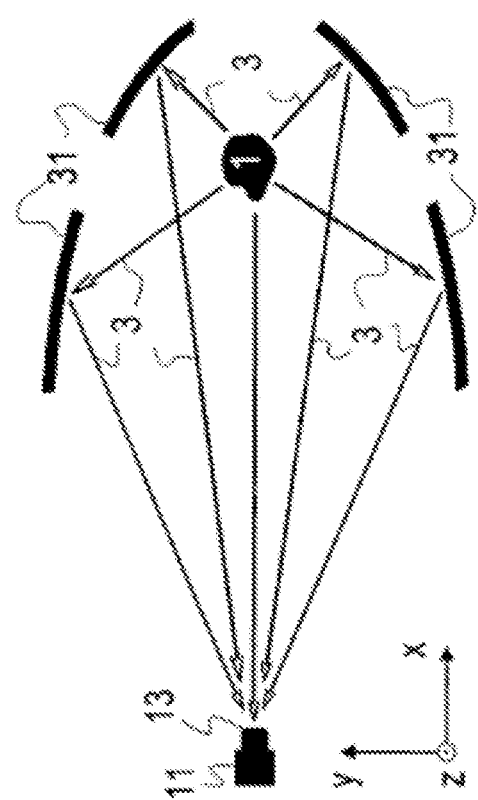
Figure 10:
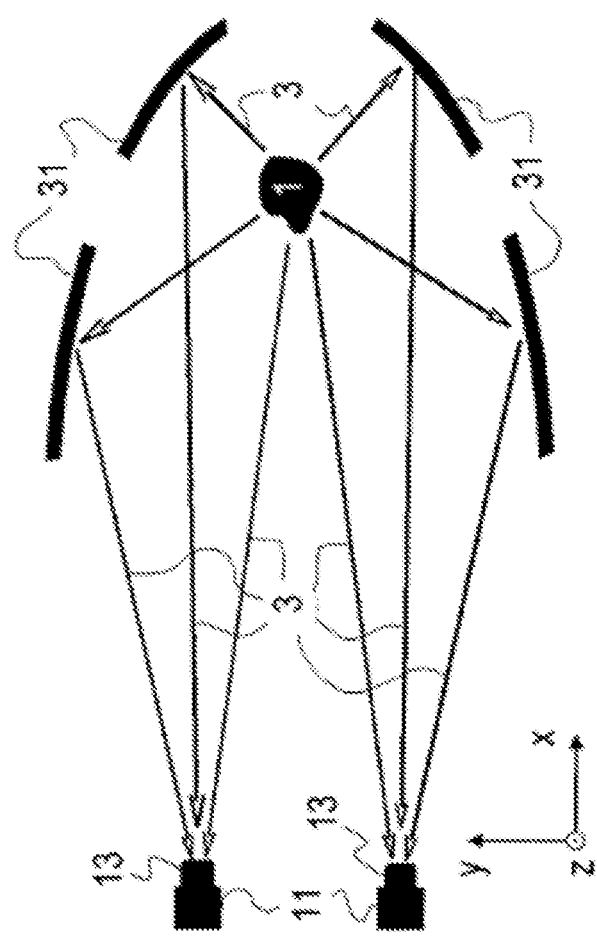

The planar reflector sections 31 of FIGS. 8A and 8B can be replaced with curved reflector sections 31, as illustrated by way of an example in FIGS. 9 and 10. The aspherically curved reflector sections 31, which preferably comprise off-axis ellipsoids or paraboloids, have an imaging and light-collecting effect. The curved reflector sections 31 are arranged with their center lines on the ellipse described above with reference to FIG. 8. Scattered light 3 from the light field 1 is displayed on a single detector camera 11 having an entocentric objective 13 (FIG. 9) or on two detector cameras 11 having entocentric objectives 13 (FIG. 10).

The curved reflector sections 31 act like a field lens (or a field mirror), which is provided in object-side telecentric objectives between the object and the camera. In this case, telecentric also means more particularly that there are not any distance-related imaging scale changes. The internal shutter for inducing telecentricity that is typical of telecentric objectives is not illustrated in FIG. 9. The advantages of the arrangement of curved reflector sections 31 as a field mirror lie firstly in the high numerical aperture of the imaging optics formed by the reflector sections 31 and the enhanced light intensity, and secondly in the telecentric effect in relation to the light field 1 to be measured. This advantageously permits a lesser distance-dependent distortion compared to simpler arrangements with planar mirrors or multi-camera arrangements according to FIG. 3.

The object-side telecentric imaging of the scattered light 3 can give rise to a construction-related reduction in light intensity. To compensate for this, the arrangement of reflector sections 31 according to FIG. 9 can be modified so as to achieve a compromise between sufficiently high light collection capacity and sufficient depth of field on one hand and sufficient telecentricity on the other hand. According to a further modification of the embodiment of FIG. 9, the reflector sections 31 could be replaced by an axicon reflector with elliptical curvature.

Figure 11:
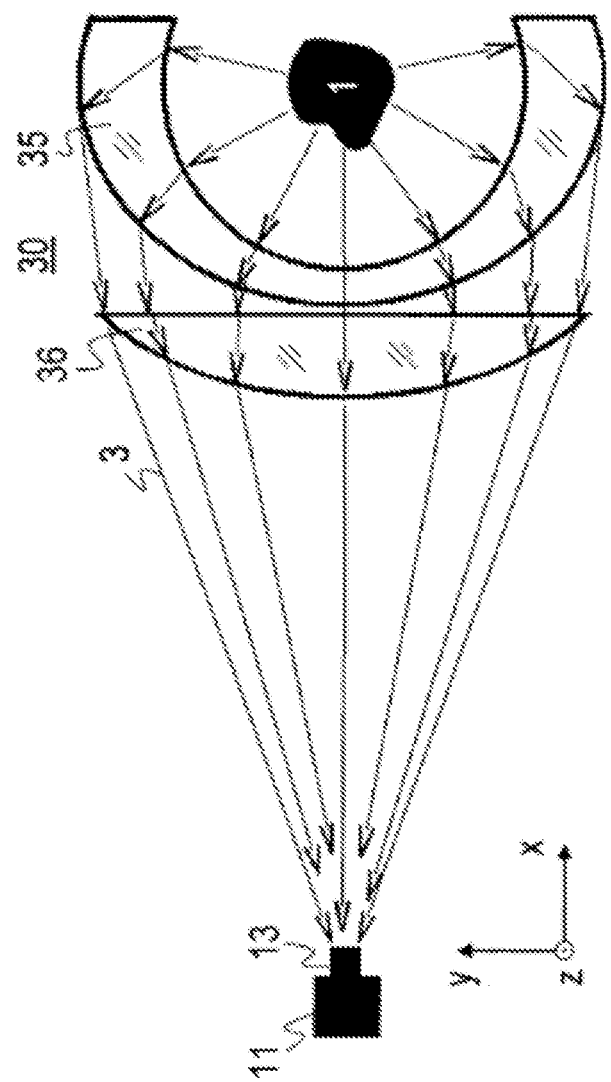
Figure 12:
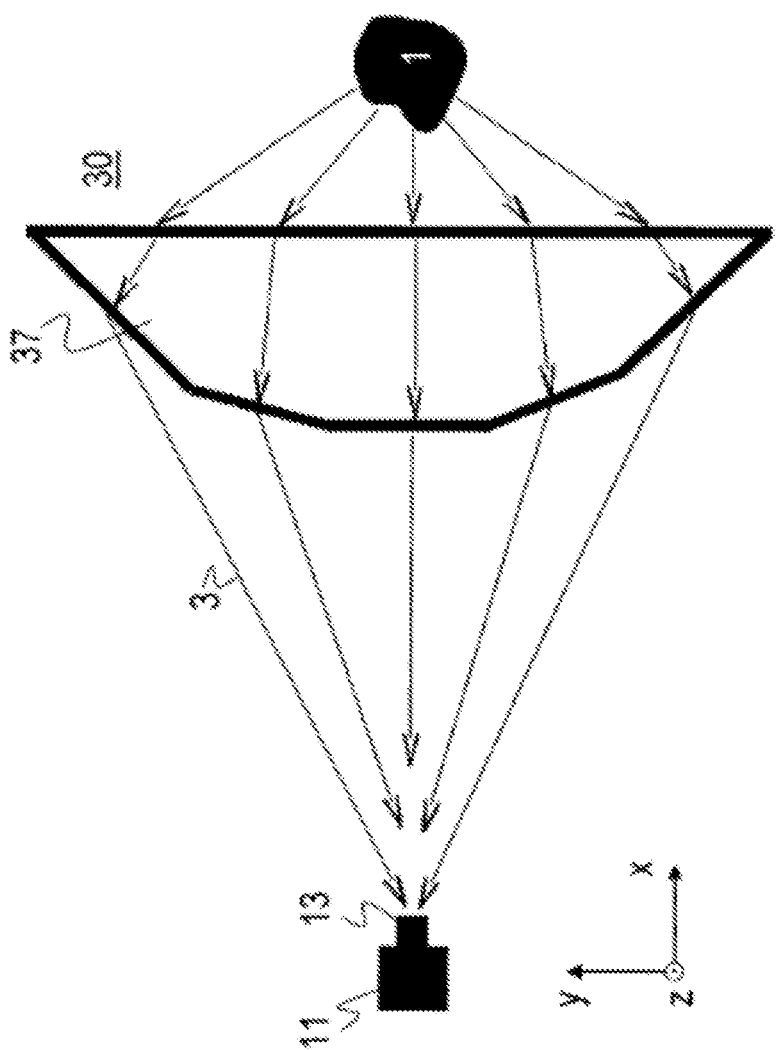

Embodiments of the invention in which the deflector device 30 comprises dioptric elements, in particular lenses 35, 36 and/or prisms 37, are illustrated in FIGS. 11 and 12. FIG. 11 shows the deflector device 30 with two lenses 35, 36, which are made of, e.g., quartz glass and which form an f-theta arrangement jointly with the objective of the detector camera 11. In a manner similar to an axicon reflector, the lenses 35, 36 provide a continuous image that contains scattered light 3 from all captured lateral angles side by side, wherein the individual scattered light images are extracted computationally from the continuous image for the tomographic reconstruction. Advantageously, a larger angle range of the scattered light 3 from the light field 1 is captured by the f-theta arrangement in FIG. 11 than by the multi-prism 37, which only displays scattered light 3 in at most a half space of 180° or less (FIG. 12). Moreover, an object-side telecentric display is also achievable with the f-theta arrangement.

According to FIG. 12, the deflector device 30 is shown with a multi-prism 37 made of, for example, quartz glass, which is formed for imaging from five lateral angles (perspectives). The arrangement according to FIG. 12 can be advantageous if due to space constraints, for example, the radiation field measuring device is only to be arranged on one side next to the light field 1 to be examined.

Figure 13:
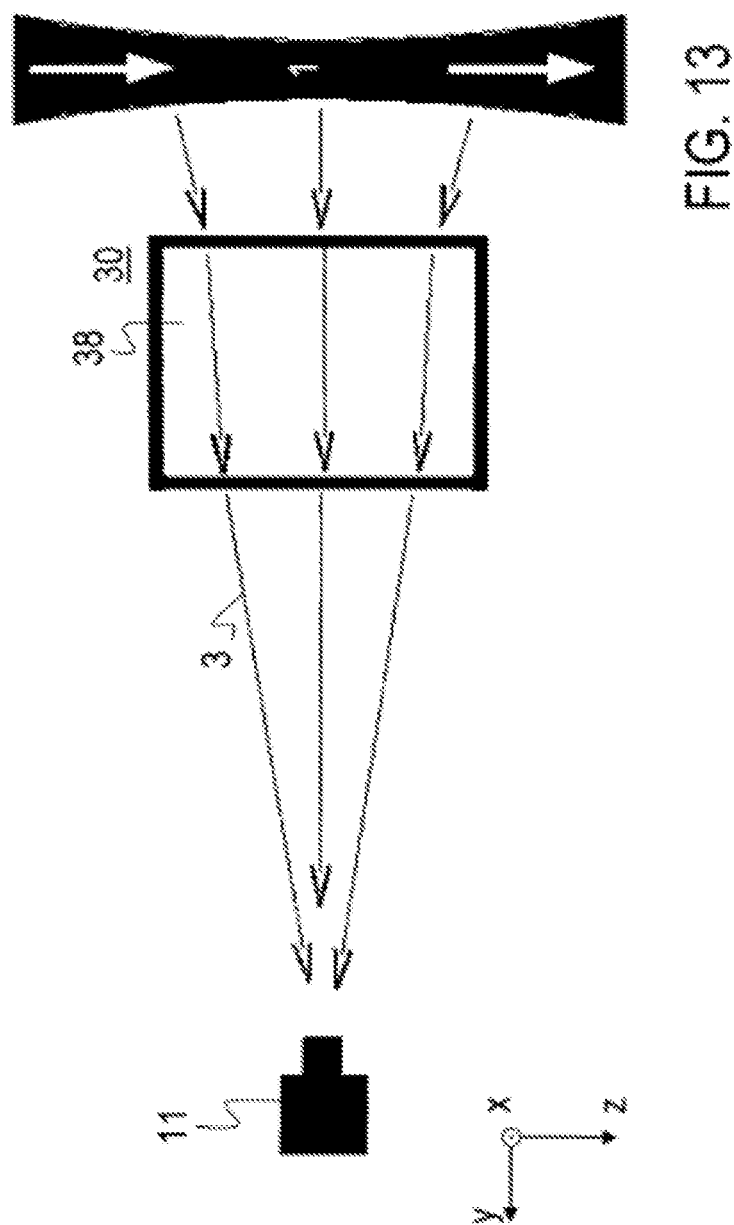
Figure 14:
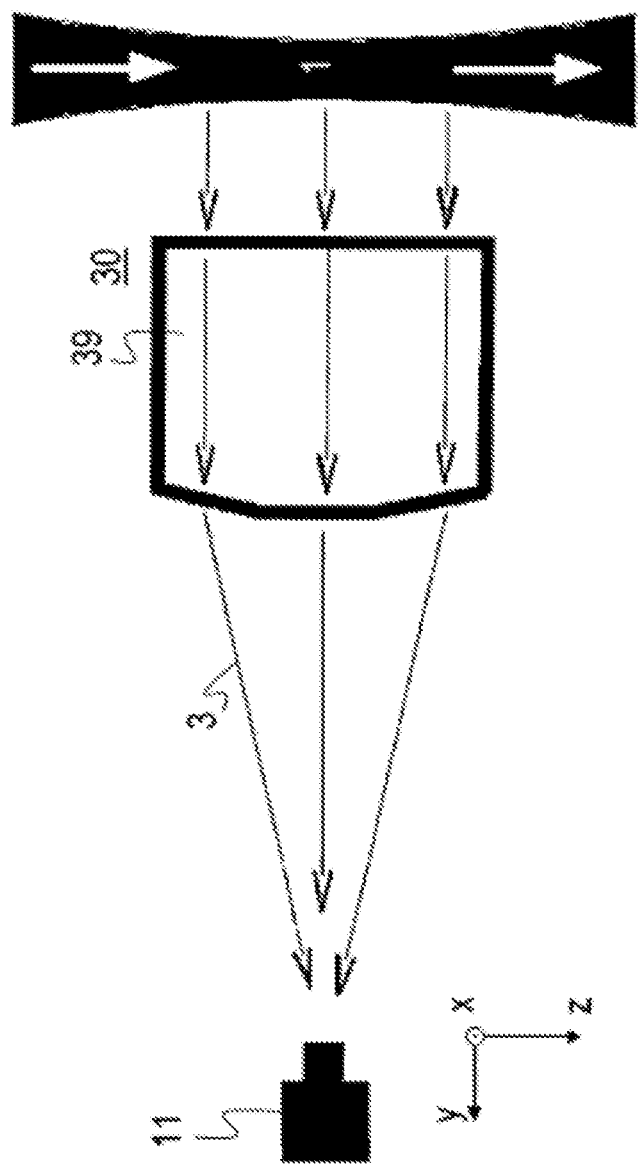

FIGS. 13 and 14 illustrate further embodiments of the invention, in which the deflector device 30 comprises dioptric elements in the form of a simple prism 38 or multi-prism 39, which are made from, for example, quartz glass. Scattered light 3 from the light field 1 is diverted via the prism 38 or multi-prism 39 to the detector camera 11, the image signal of which is sent to the reconstruction device (not illustrated). These embodiments have advantages because of the simple construction of the deflector device 30.

Figure 15:
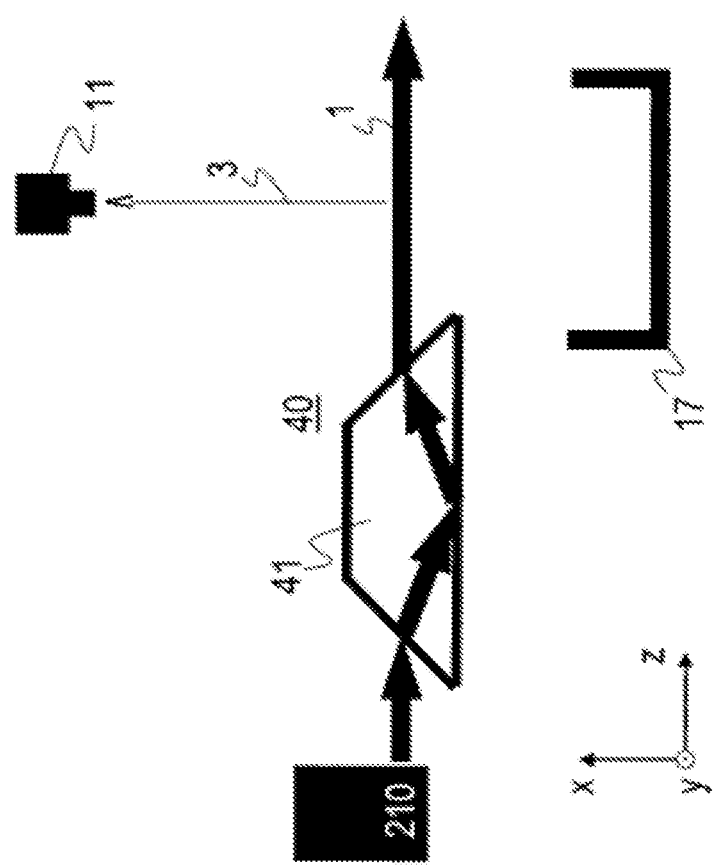
FIG. 15: features of a radiation field measuring device having a beam rotator.

The damage threshold of an optical element is dependent on the material of the optical element and in the case of quartz glass, is 1 MW/cm$^2$ for continuous laser light, for example, or 1 to 5 GW/cm$^2$ for pulsed laser light (10 ns pulse length, laser intensity at 1064 nm: 20 J/cm$^2$, pulse repetition frequency 100 Hz), for example. If the field density of the examined light field 1 is below the damage threshold of optical elements, in particular ones made of glass, the beam rotator 40 shown in FIG. 15 can be provided with a rotatable Dove prism 41 (or with rotatable mirrors, not illustrated) in order to capture scattered light 3 corresponding to different lateral directions with the detector camera 11. With the rotatably-mounted Dove prism 41, the light field 1 generated by the laser source 210 can be rotated about the longitudinal direction z, wherein an image recording takes place for each set rotation angle. Furthermore, a background screen 17 is provided, which comprises, e.g., a blackened metal or plastic panel and forms a dark background for the camera image behind the light field 1, which background minimizes reflections of the scattered light incident thereon.

The Dove prism 41 advantageously does not change the beam direction; instead it rotates itself about the beam axis z, about an angle. The laterally exiting light field 1 thus rotates about the double angle. The Dove prism 41 is turned 180° in order to permit the light field 1 to rotate 360°. The detector camera 11 can thus record scattered light images with a freely selectable number of perspectives of the light field 1. With this measurement geometry, the background advantageously remains constant for all lateral directions.

Figure 16:
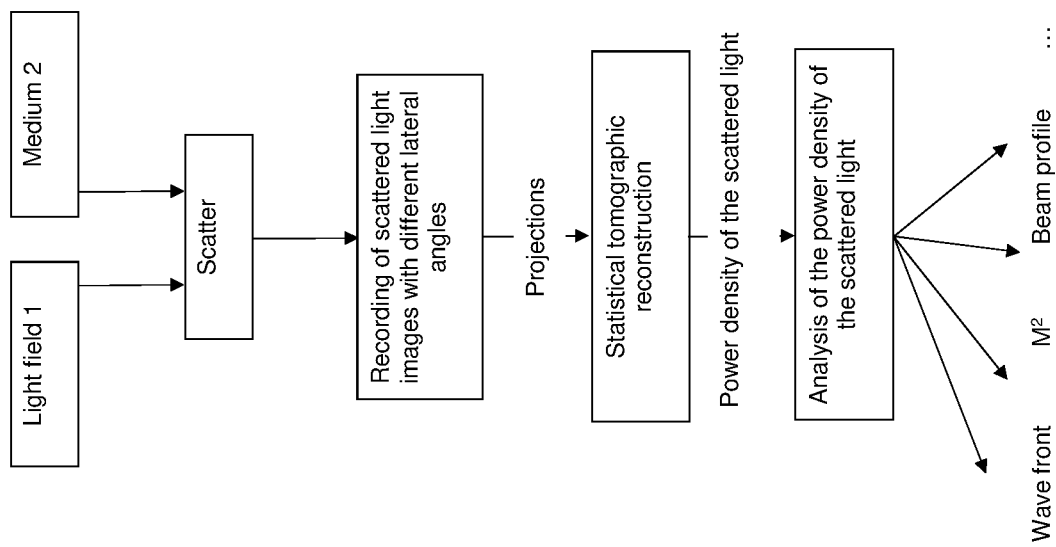
FIG. 16: a flow diagram with an illustration of features of preferred embodiments of the method according to the invention.

FIG. 16 schematically illustrates the steps of the method for the characterization of a light field 1, which passes through a medium 2. In the medium 2, scattered light is generated by Rayleigh scattering of the light field 1 on atoms or molecules of the medium 2. The intensity of the Rayleigh scattering $I_R$ is given according to $$I_R = I_0 (k/\lambda^4)(1+\cos^2 \Theta)$$

from the intensity of the light field $I_0$, a constant k, the wavelength λ and the angle Θ relative to the longitudinal direction of the light field. Accordingly, in addition to obtaining information on the intensity of the light field $I_0$, the wavelength dependency of the scattered light can also be used to characterize the light field 1. Scattered light images of the generated scattered light are recorded at different lateral angles relative to the longitudinal direction of the light field. The scattered light images provide projections of the scattered light generated by the light field 1, which undergo tomographic reconstruction. As a result, the 2D or 3D field density of the scattered light in the light field 1 is calculated, followed by an analysis to determine properties of the light field such as the beam profile or the shape of the wave front, for example.

The features of the invention disclosed in the present description, the drawings and the claims, individually as well as in combination or in subcombination, can be essential to the realization of the invention in its different designs.

What is claimed is:

1. A radiation field measuring device (100), which is configured for characterizing a radiation field (1) that passes through a medium (2) in a longitudinal direction (z), comprising:
    a detector device (10) having at least one detector camera (11), which contains at least one detector array (12) arranged for the image recording of scattered radiation (3) that is generated in the medium by the radiation field (1) and is directed in at least 3 lateral directions, that deviate from the longitudinal direction (z), and
    a reconstruction device (20), which is configured for characterizing the radiation field (1) on the basis of image signals of the detector device (10) by means of a tomographic reconstruction of a field density of the scattered radiation (3) in the radiation field (1),
characterized in that
    the detector device (10) comprises a plurality of detector cameras (11), each having at least one detector array (12) in which an associated detector camera is provided for each lateral direction in which a scattered radiation image is to be recorded or the detector device (10) comprises a single detector camera (11), which contains a plurality of detector arrays (12) that are each arranged for the image recording of scattered radiation (3) in one of the lateral directions,
    the detection device (10) is configured for a spectrally selective image recording of the scattered radiation (3), and
    the reconstruction device (20) is configured for the statistical or algebraic tomographic reconstruction of the field density of the scattered radiation (3) in the radiation field (1).

2. The radiation field measuring device according to claim 1, in which the reconstruction device (20) is configured for statistical tomographic reconstruction of the field density of the scattered radiation (3) based on an objective function to be minimized, wherein
    the objective function contains a tomographic data mismatch term which accounts for the noise characteristics of the measurement data, and
    the objective function contains at least an Lp-norm term with (0≤p<2) and a Bayesian regularization term.

3. The radiation field measuring device according to claim 1, wherein
    the reconstruction device (20) is configured for the tomographic reconstruction of a layer section of the field density of the scattered radiation (3), which can be converted into a two-dimensional intensity distribution of the radiation field (1).

4. The radiation field measuring device according to claim 1, wherein
    the reconstruction device (20) is configured for the tomographic reconstruction of the field density of the scattered radiation (3) in a three-dimensional volume section, which comprises at least two juxtaposed layer sections.

5. The radiation field measuring device according to claim 1, wherein
    a deflector device (30) is provided, which is arranged for deflecting the scattered radiation (3) along the multiplicity of lateral directions onto the at least one detector camera (11), and wherein
    the deflector device (30) comprises at least one catoptric element (31, 32, 33) or at least one dioptric element (35) and the at least one catoptric element comprises a plurality of reflector sections (31, 33), which are each arranged for deflecting the scattered radiation (3) along one of the lateral directions towards one of the detector arrays (12).

6. The radiation field measuring device according to claim 5, wherein
    the detector device (10) comprises a single detector camera (11), and
    the at least one catoptric element comprises a collection reflector (32), which is arranged for deflecting the scattered radiation (3) from the reflector sections (31, 33) to the detector camera (11).

7. The radiation field measuring device according to claim 1, comprising
    a beam rotator (40) having a rotatable prism, in particular a Dove prism (41), and/or mirrors, which is configured for rotating the radiation field (1) about the longitudinal direction (z),
wherein
    the detector device (10) comprises a single detector camera (11), which is arranged for the image recording of scattered radiation (3), and wherein
    for the image recording of scattered radiation (3) in the multiplicity of lateral directions, the radiation field (1) can be rotated with the beam rotator into different rotational positions relative to the detector camera (11).

8. The radiation field measuring device according to claim 1, further comprising
    an analyzer device (21), which is configured for determining at least one beam parameter of the radiation field (1) on the basis of the field density of the scattered radiation (3) in which the at least one of the beam parameter comprises
    pulse energy or pulse energy density of the radiation field (1) in the case of a pulsed radiation field (1), field density of the radiation field (1) in the case of a continuous radiation field (1), geometric properties of the radiation field (1), in particular beam diameter, divergence angle and/or beam shape, properties of the beam waist of the radiation field (1), in particular radius, position along the longitudinal direction (z), and/or shape of the focus in transaxial section, spatial location of the radiation field (1) in the medium (2), coherence properties of the radiation field (1), wave fronts of the radiation field (1), Rayleigh lengths of the radiation field (1), and diffraction indexes, $M^2$ and beam propagation factors k of the radiation field (1).

9. The radiation field measuring device according to claim 8, wherein the analyzer device (21) is configured for calculating a beam propagation, in particular by means of a wave front analysis, and the analyzer device (21) is configured for calculating a focus position of the radiation field (1).

10. A method for characterizing a radiation field (1) that passes through a medium (2) in a longitudinal direction (z), using a radiation field measuring device (100), comprising the steps:

recording an image by means of a detector device (10), of scattered radiation (3), which is generated in the medium (2) by the radiation field (1) and is directed in at least 3 lateral directions, that deviate from the longitudinal direction (z), and characterizing the radiation field (1) with a reconstruction device (20) using image signals of the detector device (10), wherein the reconstruction device (20) carries out a tomographic reconstruction of a field density of the scattered radiation (3) in the radiation field (1)

characterized in that the detector device (10) comprises a plurality of detector cameras (11), each having at least one detector array (12) in which an associated detector camera is provided for each lateral direction in which a scattered radiation image is to be recorded or the detector device (10) comprises a single detector camera (11), which employs a plurality of detector arrays (12) that are each arranged for the image recording of scattered radiation (3) in one of the lateral directions, and wherein the image recording is carried out spectrally selectively, and the reconstruction device (20) carries out a non-analytical, in particular statistical or algebraic, tomographic reconstruction of the field density of the scattered radiation (3).

11. The method according to claim 10, wherein the reconstruction device (20) carries out the tomographic reconstruction of the field density of the scattered radiation (3) by means of an iterative algorithm, wherein the iterative algorithm carries out a statistical tomographic reconstruction, and the statistical tomographic reconstruction is based on a statistical model with an objective functional to be minimized, the tomographic data mismatch term of which accounts for the noise characteristics of the measurement data, and the objective functional contains an Lp-norm term with ($0 \leq p < 2$) and/or a Bayesian regularization term.

12. The method according to claim 10, wherein the field density of the scattered radiation (3) is reconstructed in the forward and backward projection process of the tomographic reconstruction, with an illumination background of the radiation field (1) taken into account, and wherein deflection of the scattered radiation (3) along the multiplicity of lateral directions with the deflector device (30) onto the at least one detector camera (11), and wherein rotation of the radiation field (1) about the longitudinal direction (z) with the beam rotator, and image recording of the scattered radiation (3) with a single detector camera (11), wherein for the image recording of scattered radiation (3) in the multiplicity of lateral directions, the radiation field (1) is rotated with the beam rotator into different rotational positions relative to the detector camera (11), and wherein the field density of the scattered radiation (3) is reconstructed with particles in the medium taken into account, which particles would lead to artefacts of the reconstructed field density if they were not taken into account.

13. The method according to claim 10, further comprising at least one of the steps tomographic reconstruction of a layer section of the field density of the scattered radiation (3), and conversion of the field density of the scattered radiation (3) into a two-dimensional intensity distribution of the radiation field (1), and tomographic reconstruction of a field density of the scattered radiation (3) in a three-dimensional volume section, which comprises at least two juxtaposed layer sections.

14. The method according to claim 10, further comprising the step of capturing at least one beam parameter, wherein the at least one beam parameter is at least one of pulse energy or pulse energy density of the radiation field (1) in the case of a pulsed radiation field (1), field density of the radiation field (1) in the case of a continuous radiation field (1), geometric properties of the radiation field (1), in particular beam diameter, divergence angle and/or beam shape, properties of the beam waist of the radiation field (1), in particular radius, position along the longitudinal direction (z), and/or shape of the focus in transaxial section, spatial location of the radiation field (1) in the medium (2), coherence properties of the radiation field (1), wave fronts of the radiation field (1), Rayleigh lengths of the radiation field (1), diffraction indexes, $M^2$ and beam propagation factors k of the radiation field (1).

15. The method according to claim 14, where the capturing of the at least one beam parameter comprises at least one of the steps calculation of a beam propagation, in particular by means of wave front analysis, and calculation of focus position of the radiation field (1).

* * * * *